United States Patent
Burov et al.

[11] Patent Number: 6,153,991
[45] Date of Patent: *Nov. 28, 2000

[54] PIEZOELECTRIC STEP MOTOR

[75] Inventors: Sergey Vyacheslavovich Burov, Arkhangelsk; Jury Vladimirovich Okatov, Severodvinsk, both of Russian Federation

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/011,372

[22] PCT Filed: Jun. 5, 1997

[86] PCT No.: PCT/RU97/00179

§ 371 Date: Feb. 4, 1998

§ 102(e) Date: Feb. 4, 1998

[87] PCT Pub. No.: WO97/47078

PCT Pub. Date: Dec. 11, 1997

[30] Foreign Application Priority Data

Jun. 5, 1996 [RU] Russian Federation ............ 96111370

[51] Int. Cl.[7] .................................................. H01L 41/08
[52] U.S. Cl. ...................................... 318/320; 310/323.02
[58] Field of Search ................................ 310/323, 328, 310/323.02

[56] References Cited

U.S. PATENT DOCUMENTS

| 5,043,621 | 8/1991 | Culp | 310/316 |
| 5,068,566 | 11/1991 | Culp | 310/328 |
| 5,136,201 | 8/1992 | Culp | 310/328 |
| 5,144,187 | 9/1992 | Culp | 310/328 |
| 5,182,484 | 1/1993 | Culp | 310/328 |
| 5,241,235 | 8/1993 | Culp | 310/328 |
| 5,273,238 | 12/1993 | Sato | 244/105 |

FOREIGN PATENT DOCUMENTS

| 0112454 | 10/1983 | European Pat. Off. . |
| 0360975 | 4/1990 | European Pat. Off. . |
| 60-002081 | 8/1985 | Japan . |
| 60-082072 | 10/1985 | Japan . |
| 573828 | 10/1977 | U.S.S.R. . |
| 738016 | 5/1980 | U.S.S.R. . |

*Primary Examiner*—Elvin Enad
*Assistant Examiner*—Peter Medley
*Attorney, Agent, or Firm*—Piper Marbury Rudnick & Wolfe

[57] ABSTRACT

A piezoelectric stepping motor comprises a cylindrical housing (1), fixing devices and a movable part (4). The fixing devices are made in the form of at least two piezoelectric units (2,3), the piezoelectric unit (2) including a rotary (5), a shifting (6) and a fixing (7) piezoelectric cells, insulators (7) and a friction element (9), and the piezoelectric unit (3) including a fixing piezoelectric cell (10), insulators (8) and a friction element (9).

6 Claims, 3 Drawing Sheets

PIEZOELECTRIC STEP MOTOR

TECHNICAL FIELD

The present invention relates to the field of electric motors and, more specifically, it relates to piezoelectric stepping motors.

BACKGROUND OF THE INVENTION

Known in the art is a piezoelectric motor which stator comprises a cylindrical piezoelectric hollow cylinder having inside a cylindrical rotor frictionally interacting with the stator (SU, A, 573828).

However, this motor cannot perform a linear displacement of the cylindrical rotor.

Also known in the art is a piezoelectric linear stepping motor comprising a housing having fixing units secured in it and a movable part with a working member (SU, A, 720576).

However, this piezoelectric motor has a complicated design, performs only a linear displacement of the movable part, and cannot provide a rotation of the movable part.

SUMMARY OF THE INVENTION

The basic object of the present invention is to create a piezoelectric stepping motor which constructive embodiment would make it possible to simplify its design and manufacturing technology, to increase the motor power output and the accuracy in positioning the movable part during its rotation, linear displacement and combined motion (simultaneous rotation and linear displacement).

This object is achieved by providing a piezoelectric stepping motor comprising a housing having fixing units secured therein and a movable part, in which motor, according to the invention, the fixing units comprise at least two piezoelectric units arranged in the housing one behind the other in a longitudinal plane, the first piezoelectric unit comprising a rotary, a shifting and a fixing piezoelectric cells, insulators and a friction element, the second piezoelectric unit comprising a fixing piezoelectric cell, insulators and a friction element which interacts with the movable part, or the fixing devices comprising at least two piezoelectric units which are disposed at least in one transverse plane and made in the form of sectors.

The housing may be made movable and the piezoelectric units may be secured on a stationary cylindrical rod.

The piezoelectric cells are preferably made in the form of a packet of piezoelectric rings or their sectors which electrodes are connected in parallel alternately, in which case the direction of polarization of each successive piezoelectric ring or sector is opposite to that of the previous one.

The gaps between the piezoelectric units are preferably filled with an elastic insulating material.

Such a constructive embodiment of the claimed stepping motor makes it possible to simplify the design and manufacturing technology, to increase the forces developed by the motor and the accuracy in positioning the movable part.

BRIEF DESCRIPTION OF THE DRAWINGS

The invention is further described by way of example with reference to the accompanying drawings, in which

FIG. 5 is a longitudinal section of the motor shown in FIG. 5;

THE BEST EMBODIMENTS OF THE INVENTION

Figure 1:
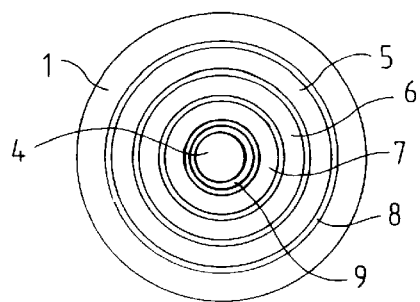
FIG. 1 is a front view of the claimed piezoelectric stepping motor (the first embodiment)
Figure 2:
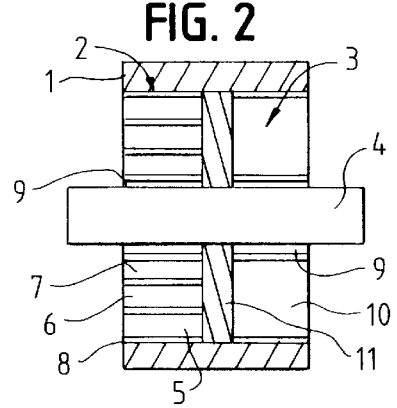
FIG. 2 is a longitudinal section of the motor shown in FIG. 1.

The piezoelectric stepping motor according to the first embodiment of the invention comprises a cylindrical housing 1 (FIG. 1), fixing devices in the form of two piezoelectric units 2 (FIG. 2) and 3, and a movable part 4 made in the form of a cylindrical rod.

The piezoelectric unit 2 comprises a rotary piezoelectric cell 5, a shifting piezoelectric cell 6, a fixing piezoelectric cell 7, insulators 8 and a friction element 9. All piezoelectric cells, insulators and friction elements forming the piezoelectric units 2 and 3 are connected together (for example, glued) and connected to the cylindrical housing 1. The rotary piezoelectric cell 5 performs the angular rotation of the movable part 4 about its axis with a polarization vector directed at an angle to the longitudinal plane. The shifting piezoelectric cell 6 performs the linear displacement of the movable part 4 along the motor axis, the vector of its initial polarization being directed at an angle to the longitudinal axis of the motor. The fixing piezoelectric cell 7 is used for fixing the movable part 4 and its vector of the initial polarization is directed (radially) perpendicularly to the longitudinal axis of the motor.

The piezoelectric unit 3 performs the fixing function and includes a fixing piezoelectric cell 10, insulators 8 and a friction element 9. The fixing piezoelectric cell 10 has a polarization vector which is (radially) perpendicular to the longitudinal axis of the motor.

The friction element 9 is made in the form of a split ring that provides tighter squeeze of the movable part 4 by the fixing piezoelectric cells 7 and 10.

Each piezoelectric cell has electrodes connected to wires (not shown in the drawing).

The gaps between the piezoelectric units 2 and 3 are filled with an elastic insulating material 11.

Other embodiments of the piezoelectric stepping motor according to the invention are possible.

Figure 3:
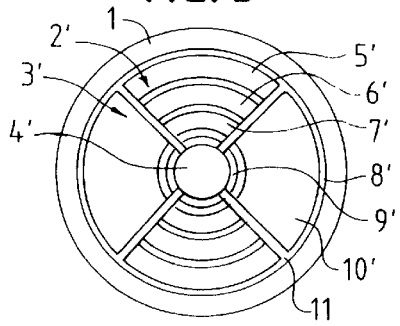
FIG. 3 is a front view of the second embodiment of the motor.
Figure 4:
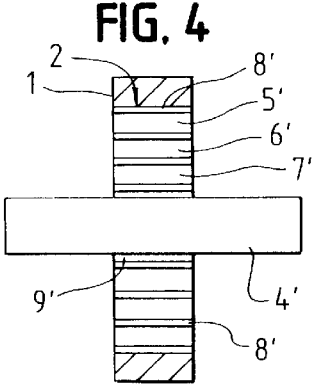
FIG. 4 is a longitudinal section of the motor shown in FIG. 3.

In the second embodiment of the motor, in contrast with the first one, and where characters 2'–10' represent parts analogous to those represented by character 2–10, respectively, of the first embodiment, piezoelectric units 2' (FIGS. 3 and 4) and 3' are disposed in one transverse plane and made in the form of sectors. This reduces considerably the size and mass of the motor.

Figure 5:
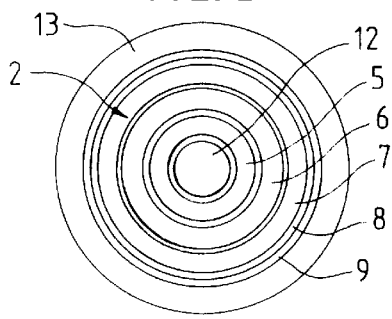
FIG. 5 is a front view of the third embodiment of the motor.
Figure 6:
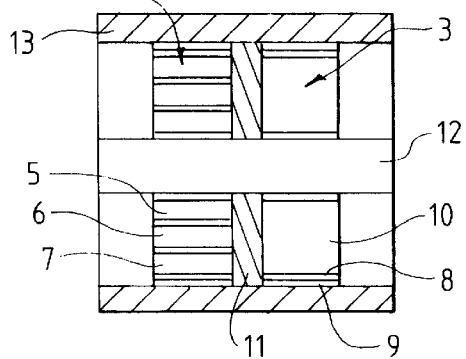

The third embodiment of the motor differs from the first one in that the cylindrical rod 12 (FIGS. 5 and 6) is stationary and the cylindrical housing 13 is movable, the piezoelectric units 2 and 3 being secured on the cylindrical rod 12.

Figure 7:
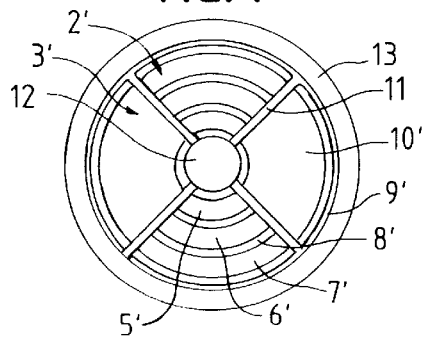
FIG. 7 is a front view of the fourth embodiment of the motor.
Figure 8:
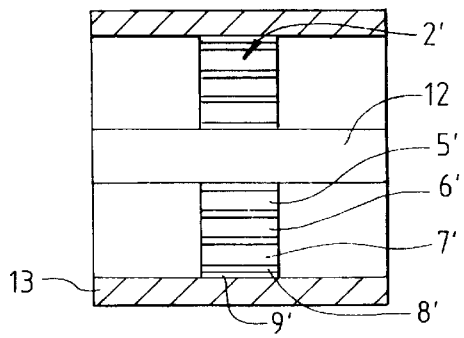
FIG. 8 is a longitudinal section of the motor shown in FIG. 7.
Figure 9:
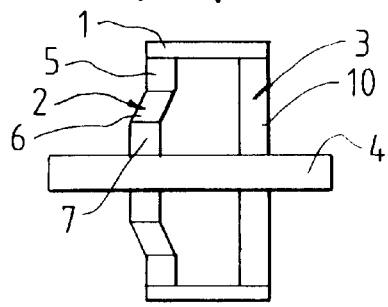
FIGS. 9–14 show the working time steps of the piezoelectric stepping motor during linear displacement of the movable part, a longitudinal section.
Figure 10:
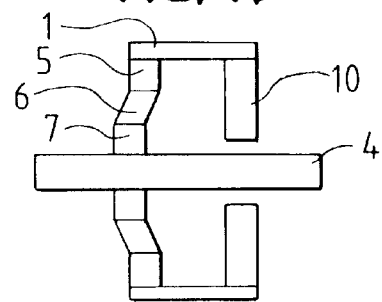
Figure 11:
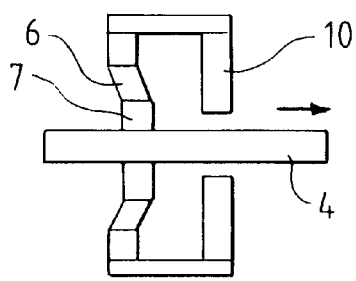
Figure 12:
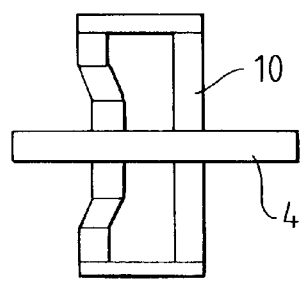
Figure 13:
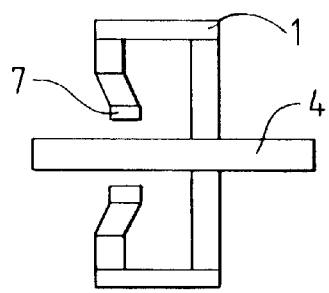
Figure 14:
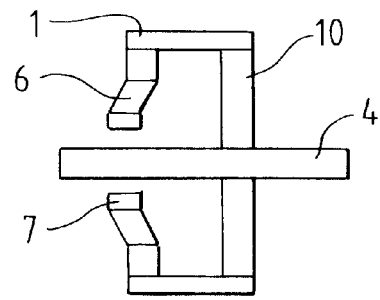

In the fourth embodiment, similar to the second embodiment the cylindrical rod 12 (FIGS. 7 and 8) is stationary while the cylindrical housing 13 can rotate and move along its axis, and the piezoelectric units 2' and 3' are disposed in one transverse plane and secured on the cylindrical rod 12.

The motor according to invention operates as follows, using the first embodiment by example.

When the positive voltage is applied to the electrodes of the rotary piezoelectric cell 5, the appearing inverse piezoelectric effect results in a rotation of the internal part of the ring through an angle α counterclockwise relative to the diametral line $A_1A_2$ (FIGS. 15–20), while the application of the negative voltage results in a rotation of the internal part through an angle α clockwise relative to the diametral line $A_1A_2$. When the positive voltage is applied to the electrodes of the shifting piezoelectric cell 6 the inverse piezoelectric effect results in a displacement of the internal part of the ring leftwards in respect to the external part of the ring, and the application of the negative voltage results in a displacement of the internal part rightwards in respect to the external part of the ring. When the positive voltage is applied to the electrodes of the fixing piezoelectric cells 7 and 8, they clamp the movable part 4 and application of the negative voltage results in pushing them apart from the movable part 4.

The piezoelectric stepping motor can perform various types of movements: a linear displacement of the movable part; a rotary motion; a combined linear and rotary motion; various combinations of these movements.

The working cycle of the motor consists of six time steps.

The operation of the motor under the conditions of a linear displacement of the movable part 4 is shown in FIGS. 9–14. In this case, the shifting piezoelectric cell 6 and the fixing piezoelectric cell 7 of the piezoelectric unit 2 and the fixing piezoelectric 10 of the piezoelectric unit 3 are operative.

The first time step corresponds to the position of the shifting piezoelectric cells 6 (FIG. 9), 7 and 10, when they are fed with positive voltage. The rotary piezoelectric cell 5 takes no part in the linear displacement and can occupy any position that is not changed during the motor operation.

In the second time step the negative voltage is applied to the fixing piezoelectric cell 10 (FIG. 10), and it is pushed apart from the movable part 4.

In the third time step the negative voltage is applied to the shifting piezoelectric cell 6 (FIG. 11) and this cell, moving rightwards, displaces the movable part 4 to the right for one step with the help of the fixing piezoelectric cell 7.

In the fourth time step the positive voltage is applied to the fixing piezoelectric cell 10 (FIG. 12), and it pushed apart from the movable part 4.

In the fifth time step the negative voltage is applied to the fixing piezoelectric cell 7 (FIG. 13), and it is pushed apart from the movable part 4.

In the sixth time step the positive voltage is applied to the shifting piezoelectric cell 6 (FIG. 14), and it is displaced leftwards together with the fixing piezoelectric cell 7. By repeating the working cycle, the movable part is displaced linearly and stepwise to the right.

During the rotation of the movable part 4 the operation of the motor is executed in accordance with the scheme shown in FIGS. 15–20.

Figure 15:
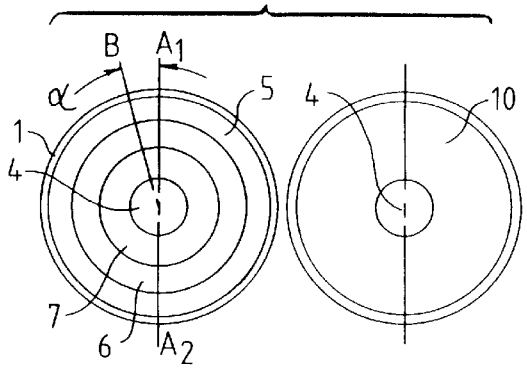
FIG. 15 shows the first working time step of the motor during rotation of the movable part, cross sections of the two piezoelectric units.
Figure 16:
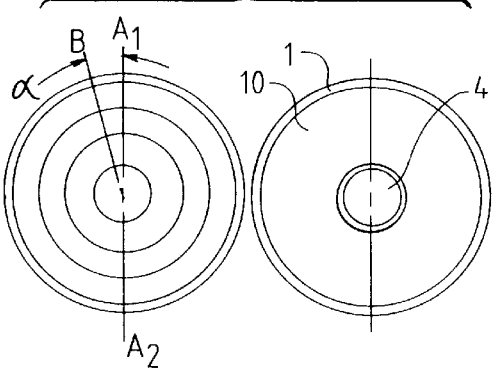
FIGS. 16–20 show other time steps of the piezoelectric stepping motor during rotation of the movable part.
Figure 17:
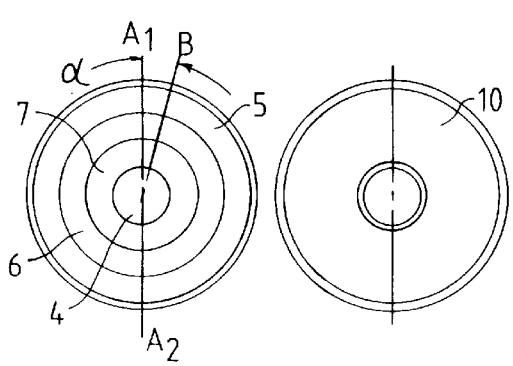
Figure 18:
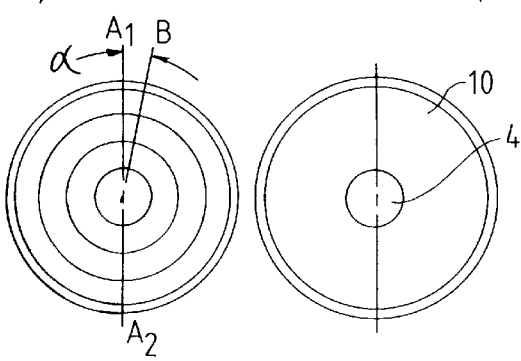
Figure 19:
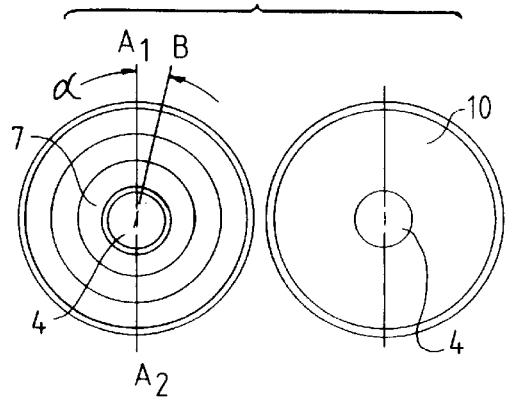
Figure 20:
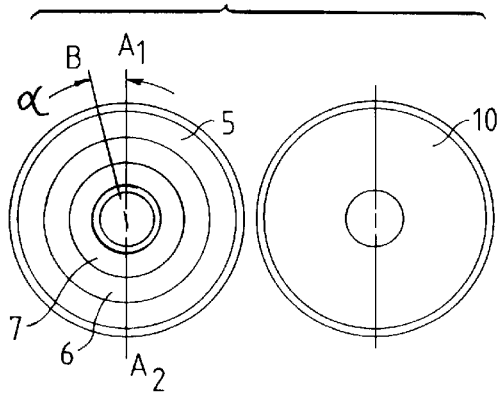

FIG. 15 shows the position corresponding to the first time step. At this step all piezoelectric cells are operative except for the shifting piezoelectric cell 6, which can occupy any position that is not changed during the operation. All other piezoelectric cells are fed with positive voltage.

In the second time step the fixing piezoelectric cell 10 (FIG. 16) is fed with the negative voltage, it is pushed apart from the movable part 4.

In the third time step the negative voltage is applied to the rotary piezoelectric cell 5 (FIG. 17) which turns the shifting piezoelectric cell 6, the fixing piezoelectric cell 7 and the movable part 4 through an angle α clockwise.

In the fourth time step the positive voltage is applied to the fixing piezoelectric cell 10 (FIG. 18), and it squeezes the movable part 4.

In the fifth time step the negative voltage is applied to the fixing piezoelectric cell 7 (FIG. 19), and it is pushed apart from the movable part 4.

In the sixth time step the positive voltage is applied to the rotary piezoelectric cell S (FIG. 20) which rotates the shifting piezoelectric cell 6 and the fixing piezoelectric cell 7 through an angle α counterclockwise. When the cycle is repeated, the movable part 4 is rotated clockwise.

The reversing motion is performed by changing the sequence of applying the voltage to the fixing piezoelectric cells.

To increase the power output the piezoelectric stepping motor may be provided with additional piezoelectric units which may be arranged both in the transverse and longitudinal plane of the motor.

The claimed piezoelectric stepping motor has a simple design and manufacturing technology, small size and mass, a high force on the movable part, a high torque, and makes it possible to combine the linear displacement and the rotation of the movable part.

In the description of the embodiments of the invention, for better understanding, a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications do not extend beyond the essences and scope of the invention and the appended claims.

INDUSTRIAL APPLICABILITY

The invention can be used as an actuating device in electrical engineering, telemechanics, radio engineering and automation.

What is claimed is:

1. A piezoelectric stepping motor comprising:
 a) a housing having an inner surface;
 b) first and second cylindrical, hollow piezoelectric units attached to the inner surface of the housing, each of the piezoelectric units being in separate transverse planes, the first piezoelectric unit having a cylindrical rotary piezoelectric cell, a cylindrical shifting piezoelectric cell, a cylindrical fixing piezoelectric cell, and a friction member attached to the fixing piezoelectric cell, the second piezoelectric unit having a cylindrical fixing piezoelectric cell and a friction member attached to the fixing piezoelectric cell; and c) a shaft, which frictionally interacts with at least one friction member, the rotary and fixing cells of the first piezoelectric unit and the fixing cell of the second piezoelectric unit being configured to operate sequentially in order to rotate the shaft, the shifting and fixing cells of the first piezoelectric unit and the fixing cell of the second piezoelectric unit being configured to operate sequentially in order to move the shaft linearly.

2. A piezoelectric stepping motor, comprising:

a) a housing having an inner surface;

b) first and second sets of cylindrical, hollow piezoelectric sectors attached to the inner surface of the housing, each of the first set of piezoelectric sectors having a rotary piezoelectric cell, a shifting piezoelectric cell, a fixing piezoelectric cell, and a friction member attached to the fixing piezoelectric cell, each of the second set of piezoelectric sectors having a fixing piezoelectric cell and a friction member attached to the fixing piezoelectric cell; and c) a movable shaft, which frictionally interacts with at least one friction member, the rotary and fixing piezoelectric cells of the first set of piezoelectric sectors and the fixing piezoelectric cells of the second set of piezoelectric sectors being configured to operate sequentially in order to rotate the shaft, the shifting and fixing piezoelectric cells of the first set of piezoelectric sectors and the fixing piezoelectric cells of the second set of piezoelectric sectors being configured to operate sequentially in order to move the shaft linearly.

3. The motor of claim 2, wherein the fixing piezoelectric cells are disposed in the first set of piezoelectric sectors between the rotary piezoelectric cells and the shaft.

4. The motor of claim 3, further comprising an insulating material disposed between and separating the piezoelectric sectors.

5. The motor of claim 3, wherein the shaft has at least one guide, and wherein at least one friction member has a guide configured to frictionally interact with at least one of the shaft guides.

6. The motor of claim 2, wherein each of the rotary piezoelectric cells have an inner surface and a rotary polarization vector such that the inner surface of the rotary piezoelectric cells will shift angularly when a voltage is applied to the rotary piezoelectric cells.

* * * * *